United States Patent
Azema

[11] Patent Number: 6,165,637
[45] Date of Patent: Dec. 26, 2000

[54] CURRENT PATH CUT-OFF MECHANISM

[75] Inventor: Tadamitsu Azema, Miyagi-ken, Japan

[73] Assignee: Alps Electric Co., Ltd., Japan

[21] Appl. No.: 09/408,625

[22] Filed: Sep. 30, 1999

[30] Foreign Application Priority Data

Oct. 1, 1998 [JP] Japan ............... 10-280365

[51] Int. Cl.[7] ............... H01M 2/12
[52] U.S. Cl. ............... 429/61; 429/57
[58] Field of Search ............... 429/53, 54, 56, 429/61, 57

[56] References Cited

U.S. PATENT DOCUMENTS

| | | | |
|---|---|---|---|
| 3,706,617 | 12/1972 | Stark et al. | 136/178 |
| 4,943,497 | 7/1990 | Oishi et al. | 429/53 |
| 5,705,290 | 1/1998 | Azema | 429/53 |
| 5,821,008 | 10/1998 | Harada et al. | 429/56 |

Primary Examiner—Stephen Kalafut
Assistant Examiner—Monique Wills
Attorney, Agent, or Firm—Brinks Hofer Gilson & Lione

[57] ABSTRACT

In the current path cut-off mechanism in a cell according to the present invention, a current path is formed between a cell lid and a power generating element through a diaphragm portion D and an internal terminal, and a base portion of the internal terminal is embedded in an insulating member by insert molding so that a bonding portion of the internal terminal becomes flush with the diaphragm portion D-side surface of the insulating member. Therefore, it is possible to eliminate variations in the position of the bonding portion of the internal terminal and hence possible to eliminate variations in the bonding strength between the internal terminal and the diaphragm portion.

4 Claims, 4 Drawing Sheets

CURRENT PATH CUT-OFF MECHANISM

BACKGROUND OF THE INVENTION

1. Field of the Invention

The present invention relates to a current path cut-off mechanism in a cell and more particularly to a current path cut-off mechanism in a cell which is to be used for ensuring safety in the event of an increase in internal pressure of a cell case.

2. Description of the Prior Art

Heretofore, for example, lithium ion secondary cells capable of being charged and having a cell case with an organic solvent-based electrolyte sealed therein have been widely used as power supplies in portable devices such as portable telephones and personal computers.

In re-charging such a cell, if overcharging is made or if charging is performed with an electric current larger than a predetermined current, a problem will occur in the cell and a gas will be generated within the cell case, with consequent increase in internal pressure and temperature of the cell case, expansion and cracking of the cell case, and oozing out of the internal electrolyte to the exterior. Such a state may exert an adverse effect on the device which incorporates the cell.

Even if such a result does not occur, if the use of the cell is continued in the above abnormal condition, the expansion of the cell will become more and more conspicuous and may lead to bursting of the cell case. Therefore, it has so far been necessary to immediately stop the use of a cell which is found to be abnormal.

A conventional current path cut-off mechanism for preventing such bursting of a cell will now be described by way of such a circular cell as shown in FIGS. 7 and 8. A cell lid 3 is secured to a cell case 1 through a gasket 2 so as to seal the interior of the cell case 1 by caulking at its peripheral portion or by welding. Below the cell lid 3 is disposed an actuator 4 which can be displaced upward.

Vent openings 3a are formed in the cell lid 3, and upon upward displacement of the actuator 4 located below the cell lid, causing cleavage, the air present in the space between the cell lid 3 and the actuator 4 escapes to the exterior through the vent openings 3a.

The actuator 4 has an annular safety valve portion 4a which is formed in a generally horizontal flat shape by drawing with a press for example. The safety vale portion 4a is centrally formed with a protuberance 4b which projects downward, and radial grooves 4c are formed in the upper surface of the flat portion around the protuberance 4b. The protuberance 4b can be made uniform in height with little variations because it formed with a press or the like.

Below the actuator 4 is disposed a stripper 5 formed by molding a resin material for example. The stripper 5 is formed with a through hole 5a for insertion therein of the protuberance 4b of the safety valve portion 4a and also formed with a vent hole 5b as a through hole.

Below the stripper 5 is disposed an insulating member 6 formed by molding a resin material for example. The insulating member 6 is formed with a hole 6a which is in communication with the hole 5a of the stripper 5 and a vent hole 6b which is in communication with the vent hole 5b of the stripper 5.

A lead 7, which is a thin metallic plate, is attached to the back side of the insulating member 6, the protuberance 4b of the safety valve portion 4a is inserted into the holes 5a and 6a of the stripper 5 and the insulating member 6, respectively, and a bonding portion 7a of the lead 7 is bonded to the tip of the protuberance 4b by spot welding for example. At the right-hand end of the lead 7 is formed a connecting portion 7b which extends downward.

The actuator 4 and the lead 7 are in electric conduction with each other and the connecting portion 7b formed at the opposite end of the lead 7 is connected to a power generating element 8, with a current path being formed between the power generating element 8 and the cell lid 3.

Upon occurrence of a trouble in the interior of the cell and with consequent rise in internal pressure of the cell case 1, the gas whose pressure has increased flows from the vent holes 5b and 6b like arrow A in FIG. 8 and acts to push up the back side of the safety valve portion 4a.

This working force exerted on the safety valve portion 4a induces a concentrated stress on the bonding portion 7a of the lead 7. When this concentrated stress becomes larger than the shear stress of the bonding portion 7a, the bonding portion 7a is ruptured or stripped from the protuberance 4b, so that the safety valve portion 4a is displaced upward to cut off the electric connection between the lead 7 and the actuator 4, whereby the current path of the cell is cut off.

As a result, the current flow in the interior of the cell is cut off to prevent a rise in internal pressure of the cell case 1 and thus the burst of the cell can be prevented.

In the above conventional current path cut-off mechanism, since the stripper 5 and the insulating member 6 are formed by molding, variations in plate thickness are large due to variations in molding conditions. If the variations in plate thickness of the stripper 5 and the insulating member 6 are large, there arises the problem that variations in gap size between the actuator 4 and the lead 7 also become large.

More particularly, if the plate thickness of the stripper 5 and that of the insulating member 6 both vary on the minus side, the protuberance 4b will strike against the lead 7 at the time of bonding the actuator 4 to the lead 7. This results in the safety valve portion 4a being somewhat displaced upward to form a slight gap between the stripper 5 and the underside of the safety valve portion 4a, as shown in FIG. 9.

With the safety valve portion 4a somewhat displaced upward, the working force for displacing the safety valve portion varies. Thus, this sometimes results in unreliable operation of the safety valve portion 4a even if the internal pressure of the cell should increase above a predetermined value.

On the other hand, when the plate thickness of the stripper and that of the insulating member 6 both vary on the plus side, as shown in FIG. 10, a gap is formed between the tip of the protuberance 4b and the lead 7 and it is therefore impossible to bond the protuberance to the bonding portion 7a. Thus, the results is that sometimes the foregoing current path cannot be formed. Even if the protuberance 4b is bonded forcibly to the bonding portion 7a, the bonding strength of the bonded portion will become lower than a desired value, thus giving rise to the problem that the safety valve portion 4a operates at an internal pressure of the cell below a predetermined value.

A problem also exists when in assembling a conventional current path cut-off mechanism in a cell, the lead 7 is stripped from the insulating member 6 or is deformed due to mishandling of the connecting portion 7b extended downward from the lead 7, thus giving rise to variations in bonding strength of the bonded portion between the protuberance 4b and the bonding portion 7a.

SUMMARY OF THE INVENTION

It is an object of the present invention to solve the above-mentioned problems and provide a current path cut-off mechanism in a cell of a high performance capable of ensuring the bonding between the actuator 4a and the lead 7 and capable of surely cutting off the current path formed in the interior of the cell case 1.

According to the first embodiment for solving the above-mentioned problems there is provided a current path cut-off mechanism in a cell, comprising a cell case which houses a power generating element therein, a cell lid for shielding the interior of the cell case in a hermetically sealed manner, a diaphragm portion formed in part of the cell lid and capable of being displaced upward in response to a change in internal pressure of the cell case, an internal terminal connected to the power generating element and bonded to the diaphragm portion centrally or thereabouts, and an insulating member for insulation of the internal terminal and the cell lid from the power generating element, wherein a current path is formed between the cell lid and the power generating element through the diaphragm portion and the internal terminal, and a part of the internal terminal is embedded in the insulating member.

According to the second embodiment for solving the foregoing problems, the internal terminal has a bonding portion to be bonded to the diaphragm portion, and with the bonding portion exposed from the insulating member, a part of the internal terminal is embedded in the insulating member and the bonding portion of the internal terminal and the diaphragm portion are bonded together.

According to the third embodiment for solving the foregoing problems, the bonding portion of the internal terminal is flush with the diaphragm portion-side surface of the insulating member.

According to the fourth embodiment for solving the foregoing problems, the diaphragm portion has a protuberance projecting downward, the internal terminal is provided with a flat base portion having the bonding portion, the insulating member has a bonding hole, the base portion of the internal terminal is embedded in the insulating member with the bonding portion thereof positioned within the bonding hole, and the protuberance of the diaphragm portion is bonded to the bonding portion positioned within the bonding hole.

According to the fifth embodiment for solving the foregoing problems, the internal terminal embedded in the insulating member has a lead mounting portion extending outward from one end face of the insulating member, the lead mounting portion being folded back from the one end face of the insulating member so as to be in contact with the underside of the insulating member.

According to the sixth embodiment for solving the foregoing problems, vent openings are formed in the diaphragm portion-side surface of the insulating member so as to extend from end faces of the insulating member into communication with the portion located under the diaphragm portion.

DETAILED DESCRIPTION OF PREFERRED EMBODIMENTS

Figure 1:
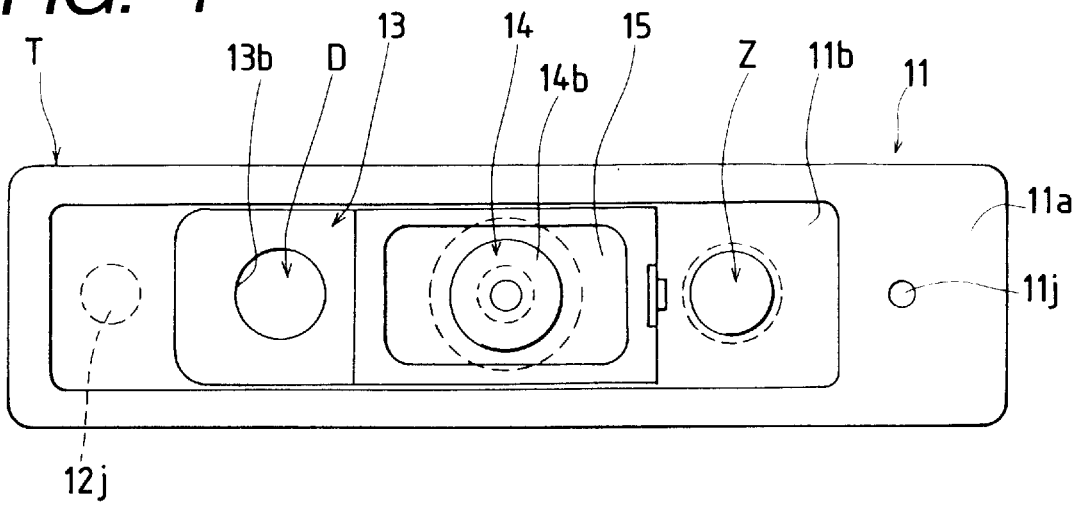
FIG. 1 is a top view of a current path cut-off mechanism in a cell according to an embodiment of the present invention.
Figure 2:
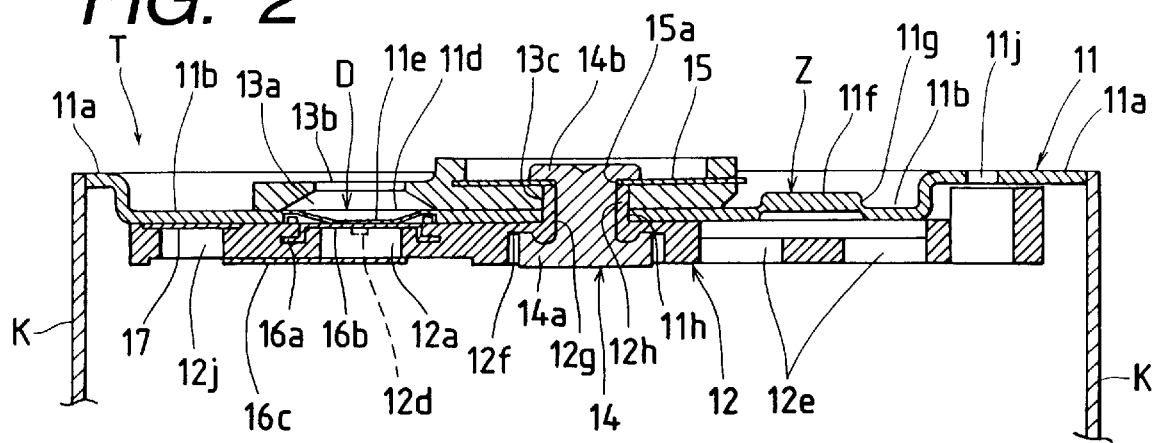
FIG. 2 is a sectional view of a principal portion of the current path cut-off mechanism.
Figure 3:
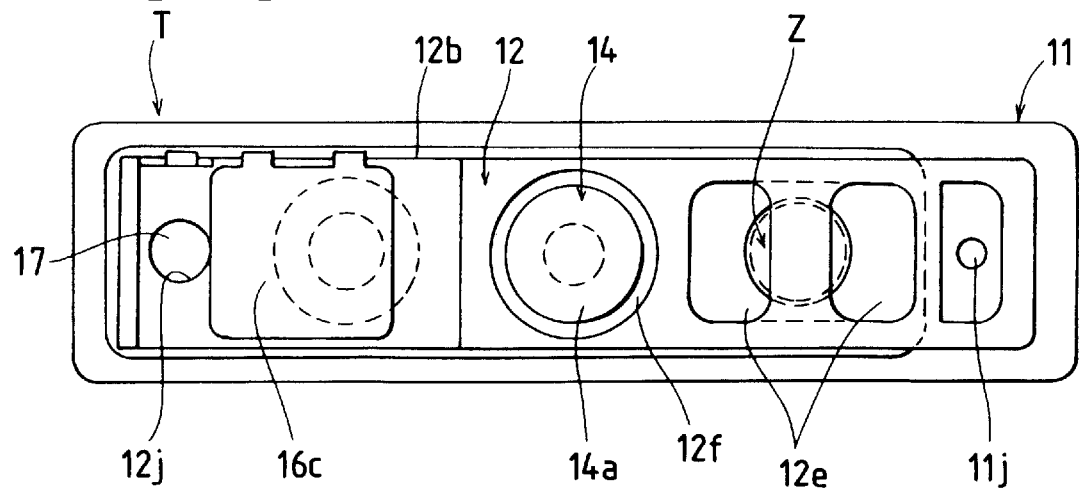
FIG. 3 is a bottom view of the current path cut-off mechanism.
Figure 4:
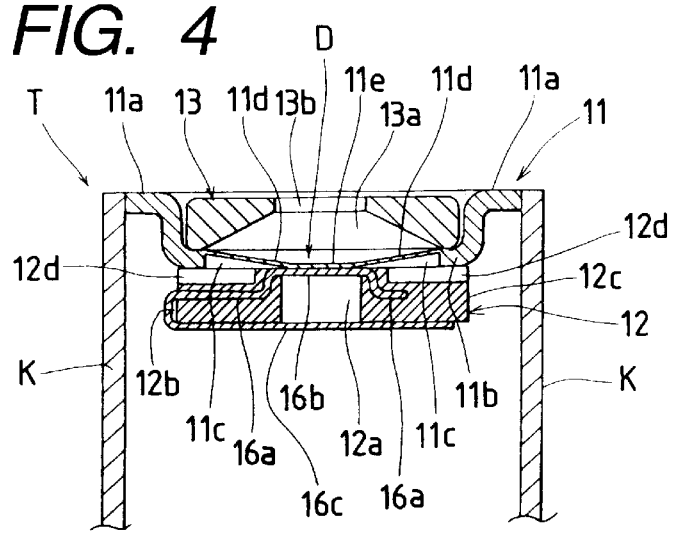
FIG. 4 is a sectional view of a principal portion of the current path cut-off mechanism.
Figure 5:
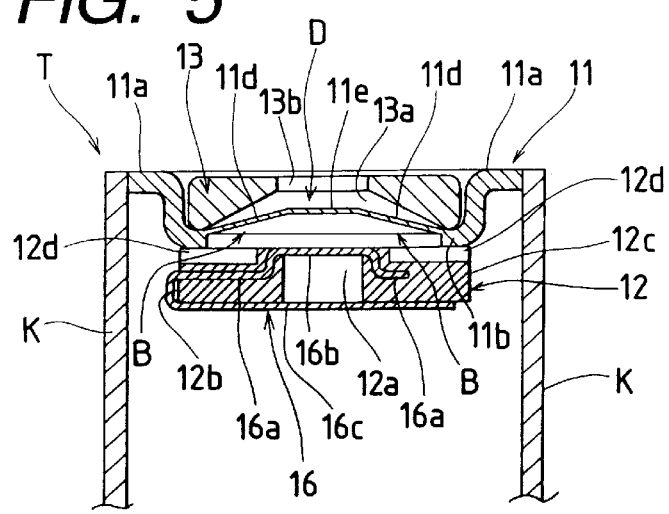
FIG. 5 is a sectional view of a principal portion of the current path cut-off mechanism, explaining the operation of a diaphragm portion used in the current cut-off mechanism.
Figure 6:
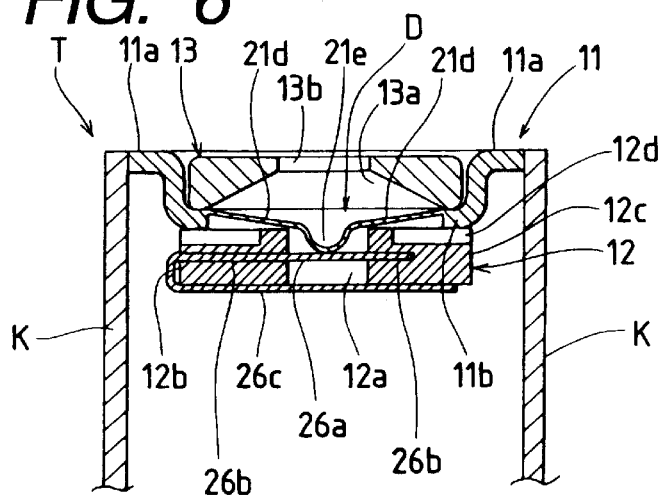
FIG. 6 is a sectional view of a principal portion of a current path cut-off mechanism according to another embodiment of the present invention.
Figure 7:
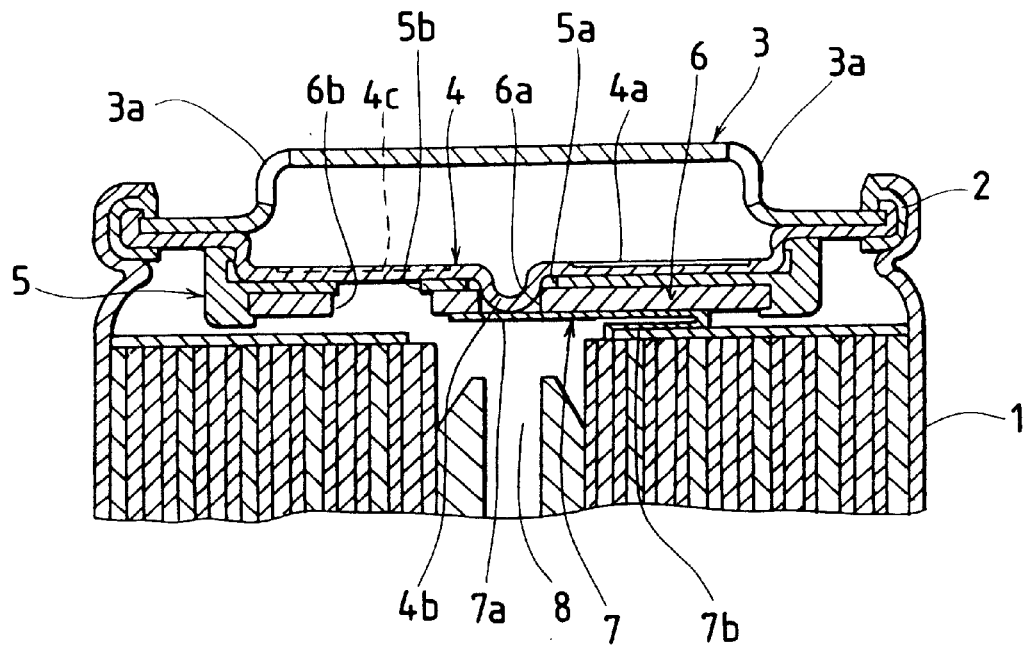
FIG. 7 is a sectional view of a principal portion of a conventional current path cut-off mechanism in a cell.
Figure 8:
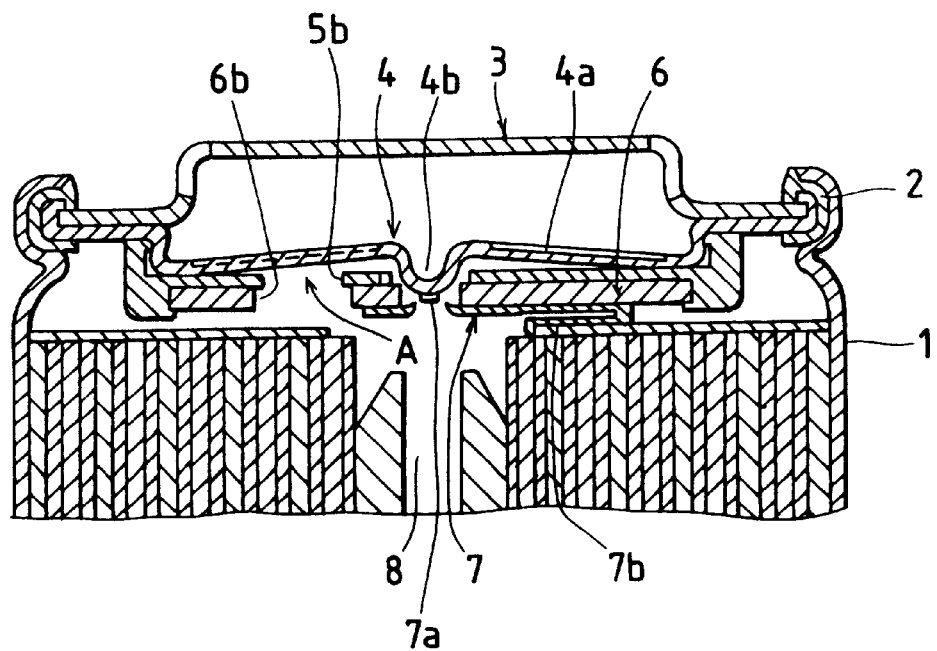
FIG. 8 is a view similar to FIG. 7 for explaining the operation of the conventional current path cut-off mechanism.
Figure 9:
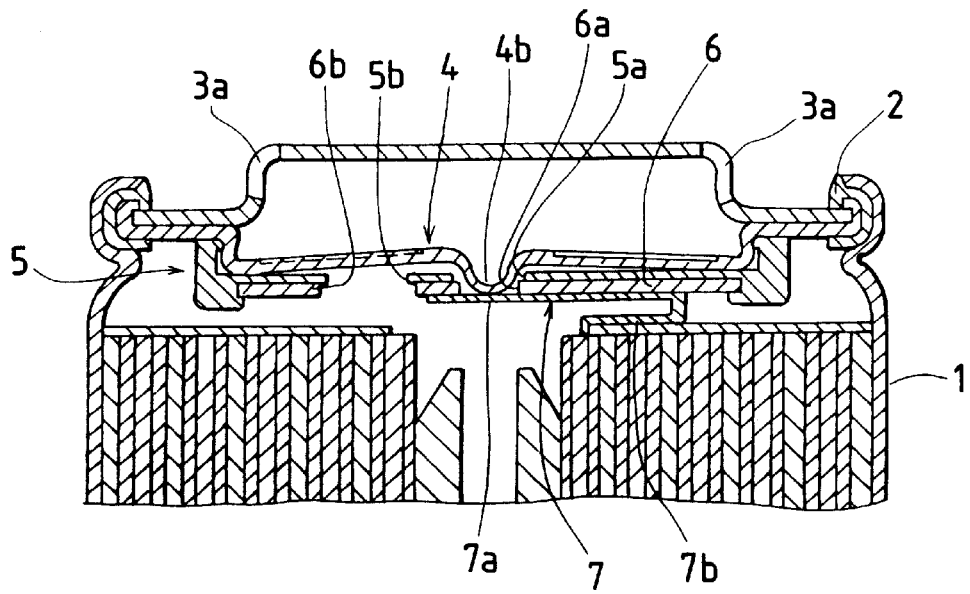
FIG. 9 is a view similar to FIG. 7 for explaining a problem of the conventional current path cut-off mechanism.
Figure 10:
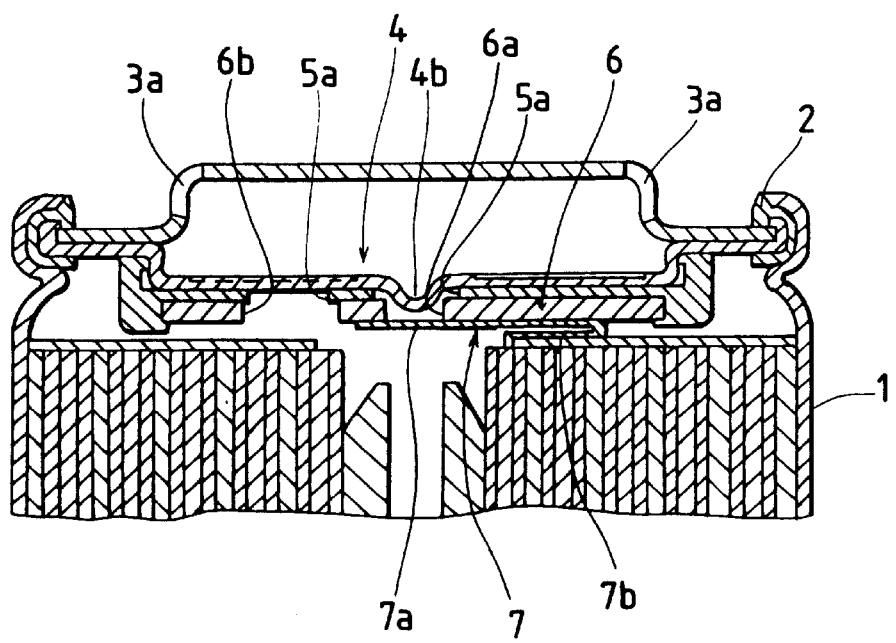
FIG. 10 is a view similar to FIG. 7 for explaining a problem of the conventional current path cut-off mechanism.

Current path cut-off mechanisms in a cell according to embodiments of the present invention will be described below with reference to FIGS. 1 to 6, of which FIG. 1 is a top view of a current path cut-off mechanism according to an embodiment of the invention, FIG. 2 is a sectional view of a principal portion of the current path cut-off mechanism as secured to a cell case, FIG. 3 is a bottom view of the current path cut-off mechanism, FIG. 4 is a sectional view of a principal portion of the current path cut-off mechanism, FIG. 5 is a sectional view thereof for explaining the operation of the same mechanism, and FIG. 6 is a sectional view of a principal portion of a current path cut-off mechanism according to another embodiment of the present invention.

A schematic construction of a current path cut-off mechanism T in a rectangular cell for example will now be described with reference to FIGS. 1 to 4. First, a cell case K is provided which houses a power generating element (not shown) therein, and a cell lid 11, which shields the interior of the cell case K in a hermetically sealed manner, is mounted on an opening side of the cell case K. The cell lid 11 is held in a sandwiched fashion between an insulating member 12 mounted below the lid and a holding member 13 mounted above the lid. The cell lid 11, the insulating member 12 and the holding member 13 are rendered integral with one another by caulking a central rivet 14.

In part of the cell lid 11 is formed a diaphragm portion D which is expanded inwards of the cell case K and which is displaceable upward in response to a change in internal pressure of the cell case.

The rivet 14 is connected to an external positive electrode 15 which is secured to the holding member 13, and part of an internal terminal 16, which is constituted by an internal negative electrode, is embedded integrally in the insulating member 12 by insert molding for example. The internal terminal 16 is bonded at a bonding portion 16b thereof to the diaphragm portion D to make an electrical connection of the internal terminal 16 with the cell lid 11.

Further, the internal terminal 16 is connected to a negative electrode lead (not shown) extending from a negative electrode of the power generating element (not shown) which is received in the cell case K, and a current path is formed between the cell lid 11 and the power generating element through the diaphragm portion D and the internal terminal 16. In this way there schematically is constituted the current path cut-off mechanism embodying the present invention.

The current path cut-off mechanism T in a cell described briefly above will now be described in detail. The cell lid 11 is formed in a generally rectangular external shape using an electrically conductive metallic plate such as a stainless steel plate. The cell lid 11 has a flat flange portion 11a as an outer peripheral portion and a flat bottom plate 11b formed inside the flange portion 11a by drawing for example and projecting downward.

The bottom plate 11b is partially formed with the diaphragm portion D on the left-hand side in FIG. 2 and a safety valve portion Z on the right-hand side.

As shown in FIG. 4 which is a sectional view of a principal portion, the diaphragm portion D comprises an annular recess 11c formed from the lower surface side of the bottom plate 11b by grinding for example, a thin-walled portion 11d formed by thinning the bottom plate 11b at an outer position of the recess 11c, and a thick-walled portion 11e formed by thickening the bottom plate at a central position of the recess 11c.

The thin-walled portion 11d is expanded downward in a dish shape by pressing for example and the thick-walled portion 11e is positioned on the lower side relative to the base end side of he thin-walled portion 11d.

In the diaphragm portion D, the central thick-walled portion 11e positioned on the lower side can be displaced upward with the base end side of the thin-walled potion 11d as fulcrum which portion 11d is located on the outer periphery side of the recess 11c. The safety valve portion z formed on the right-hand side of the cell lid 11 in FIG. 2 comprises a flat, thick-walled protuberance 11f having a generally annular external shape and projecting upward, and a connecting portion 11g formed by thinning the outer peripheral base end portion of the protuberance 11f.

The cell lid 11 is centrally formed with a central hole 11h for insertion therein of a boss portion 12h of the insulating member 12 which will be described later. The right-hand side of the flange portion 11a is formed a little wider and an electrolyte inlet 11j is formed therein as a through hole.

On the underside of the bottom plate 11b of the cell lid 11 is disposed an insulating member 12 formed of a resin material and having an external shape which is a little smaller than the cell lid 11. A bonding hole 12a of a predetermined size is formed as a through hole in the portion of the insulating member 12 where the thick-walled portion 11e of the diaphragm portion D is positioned. Further, as shown in FIG. 4, a pair of groove-like first vent openings 12d are formed horizontally in the surface portion of the insulating member 12 corresponding to the diaphragm portion D so as to extend from left and right end faces 12b, 12c in the transverse direction of the insulating member 12 and communicate with the portion below the diaphragm portion D.

As the internal pressure of the cell case K increases, the gas whose pressure has increased flows horizontally through the first vent openings 12d, further flow sideways into the portion below the thin-walled portion 11d of the diaphragm portion D, and acts to push up the thin-walled portion 11d.

In the insulating member 12 located below the safety valve portion Z shown in FIG. 2 are formed two second vent openings 12e as through holes, through which the inside gas of the cell which has become high in pressure is transferred to the safety valve portion Z. Centrally of the insulating member 12 is formed a spot-faced hole 12f at a predetermined depth, and a boss portion 12h having a rivet hole 12g is formed centrally of the spot-faced hole 12f so as to project upward. In the insulating member 12 is formed a welding hole 12j as a through hole of a predetermined size at an outer position on the left-end side with respect to the position where the internal terminal 16 bonded to the diaphragm D is embedded.

A holding member 13 is disposed on the upper surface of the bottom plate 11b of the cell lid 11, and the cell lid 11 is held in a sandwiched fashion between the insulating member 12 and the holding member 13.

The holding member 13 is formed of an insulating resin material and has a cavity portion 13a formed above the diaphragm portion D so as to permit an upward displacement of the diaphragm portion, and a through hole 13b is formed in communication with the upper portion of the cavity portion 13a. The cavity portion 13a is in communication with the exterior through the through hole 13b.

When the internal pressure of the cell case K becomes high and the diaphragm portion D is displaced upward, the air present in the cavity portion 13a is released to the exterior through the through hole 13b, so that the displacement of the diaphragm portion can be done smoothly. The safety valve portion Z is opened and there is nothing for shielding.

In the holding member 13 is formed a through hole 13c into which is inserted the boss portion 12h of the insulating member 12.

A rivet 14 formed of aluminum for example is inserted into the rivet hole 12g of the insulating member 12. On the lower side of the rivet 14 is formed a head portion 14a which is positioned in the spot-faced hole 12f. A stem portion extends upward from the head portion 14a and a caulking portion 14b is formed at the tip of the stem portion so as to project from the rivet hole 12g when the stem portion is inserted into the rivet hole. The caulking portion 14b of the rivet 14 is caulked with a caulking jig (not shown) and is expanded outward in a generally circular shape into electrical conduction with an outer positive electrode 15 which is formed around the through hole 13c using a nickel plate for example. The inside head portion 14a of the rivet 14 and a positive electrode of the power generating element (not shown) are connected with each other through a connecting lead (not shown), so that the outer positive electrode 15 and the power generating element are in an electrically connected state.

A sealing material (not shown) such as a synthetic rubber sealant is applied to the portion where the head portion 14a of the rivet 14 contacts the bottom of the spot-faced hole 12f, to seal the interior of the cell case K hermetically.

The outer positive electrode 15 has a rivet hole 15a which permits insertion therein of the caulking portion 14b prior to caulking of the rivet 14, and it is embedded in the holding member 13 by insert molding or the like at a cut-in position of a predetermined depth from the holding member surface.

Below the diaphragm portion D is disposed an internal electrode 16 formed by an internal negative electrode which is partially embedded in the insulating member 12. The internal terminal 16, which is constituted by a nickel plate or the like, is formed to have a flat base portion 16a and a bonding portion 16b projecting from the base portion 16a toward the diaphragm portion D, by press working for example.

The base portion 16a as part of the internal terminal 16 is embedded in the insulating member 12 by insert molding for example.

The bonding portion 16b of the internal terminal 16 for bonding to the diaphragm portion D is exposed from the insulating member 12 so as to become flush with the diaphragm portion-side surface of the insulating member. In this state, the base portion 16a as part of the internal terminal 16 is embedded in the insulating member 12 by insert molding for example and the bonding portion 16b is bonded to the thick-walled portion 11e of the diaphragm portion D by welding for example.

The internal terminal 16 is formed with a lead mounting portion 16c of a wide area extending outward from one end face 12b of the insulating member 12. The lead mounting portion 16c is folded back from the end face 12b so as to be in contact with the underside of the insulating member 12.

The lead mounting portion 16c and the negative electrode of the inside power generating element (not shown) are connected with each other through a connecting lead (not shown), so that the internal terminal 16 and the power generating element are in an electrically connected state.

A metallic plate 17 insulated from the internal terminal 16 is disposed above the welding hole 12j shown in FIG. 2 of the insulating member 12 in such a manner that th surface thereof is flush with the bonding portion 16b of the internal terminal 16. A portion of the metallic plate 17 is embedded in the insulating member 12 by insert molding for example. The metallic plate 17 is welded to the bottom plate 11b of the cell lid 11 by spot welding for example, the left end portion of the insulating member 12 is fixed to the cell lid 11, and the insulating member 12 is secured to the cell lid with both rivet 14 and metallic plate 17.

According to this construction, even if the internal pressure of the cell rises and a high-pressure gas flows into the recess 11c of the diaphragm portion D, the insulating member 12 is not deformed downward and it is possible to prevent contact of the internal terminal 16 with the power generating element (not shown) disposed in the interior of the cell and the resulting short-circuit, which are caused by a downward deformation of the insulating member 12.

In the current path cut-off mechanism T in a cell according to the present invention which is constructed as above, as shown in FIG. 2, the flange portion 11a as an outer peripheral portion of the cell lid 11 is positioned in the opening of the cell case K, then the outer periphery of the flange portion 11a is fixed to the cell case K by welding for example, thereafter a predetermined electrolyte (not shown) is poured from the electrolyte inlet 11j, and the inlet 11j is then closed by welding for example, whereby the interior of the cell case K is sealed hermetically.

In the cell with the current path cut-off mechanism T thus attached thereto, a current path is formed between the cell lid 11 and the interior power generating element (not shown) through the diaphragm portion D and the internal terminal 16.

The current path cut-off mechanism T operates in the following manner. Upon occurrence of a trouble in the interior of the cell and consequent rise in internal pressure of the cell case K, as shown in FIG. 5, the gas present in the interior of the cell case K which gas has increased in its pressure flows through the first vent openings 12d and enters the recess 11c horizontally like arrows B.

As a result, an operating force acting to push up the thin-walled portion 11d is created by the high-pressure gas which has entered the recess 11c.

When the internal pressure of the cell case K increases above a predetermined value, the thick-walled portion 11e of the diaphragm portion D bonded to the bonding portion 16b of the internal terminal 16 is peeled off the internal terminal, or the internal terminal 16 is ruptured and the diaphragm portion D is inverted upward. By this upward inversion of the diaphragm portion D the current path between the cell lid 11 and the power generating element is cut off.

Upon cut-off of the current path, the evolution of gas, etc. in the cell stops and hence the increase in internal pressure of the cell case K is suppressed, whereby a trouble such as bursting or cracking of the cell case K can be prevented.

If the increase in internal pressure of the cell does not stop even after cut-off of the current path, a further increased internal pressure of the cell is exerted on the protuberance 11f of the safety valve portion Z and acts to push up the protuberance 11f.

As a result, part of the connecting portion 11g which is formed thin is broken and the high-pressure gas present in the interior of the cell is discharged to the exterior from the thus-broken part, whereby the bursting or the like of the cell can be prevented. Thus, a double safety structure is ensured.

Referring now to FIG. 6, there is illustrated a current path cut-off mechanism according to another embodiment of the present invention. As shown in the same figure, a thin-walled portion 21d is centrally formed thick and at this thick portion is provided a protuberance 21e projecting downward. An internal terminal 26 is provided with a flat base portion 26b having a bonding portion 26a, and with the bonding portion 26a positioned within a bonding hole 12a of an insulating member 12, the base portion 26b is embedded in the insulating member 12 by insert molding for example and the protuberance 21e of the diaphragm portion D is bonded to the bonding portion 26a positioned within the bonding hole 12a by spot welding for example.

In the current path cut-off mechanism in a cell according to the present invention, as set forth above, since a current path is formed between the cell lid and the power generating element through the diaphragm portion and the internal terminal and part of the internal terminal is embedded in the insulating member by insert molding for example, variations in the position of the internal terminal can be eliminated by performing the insert molding with the surface of the internal terminal as a reference and hence the diaphragm portion can be bonded to the internal terminal positively at an appropriate strength. Consequently, it is possible to provide a current path cut-off mechanism in a cell wherein the diaphragm portion can be displaced upward appropriately in accordance with a change in internal pressure of the cell.

Besides, since part of the internal terminal is embedded in the insulating member by insert molding for example, not only the handleability of the insulating member in assembling work is improved but also deformation or the like of the internal terminal does not occur and the bonding strength between the diaphragm portion and the internal terminal can be stabilized.

Moreover, the internal terminal has a bonding portion to be bonded to the diaphragm portion, and with this bonding portion exposed from the insulating member, part of the internal terminal is embedded in the insulating member and the bonding portion of the internal member and the diaphragm portion are bonded together. Therefore, part of the internal terminal can be secured to the insulating member positively by insert molding for example, and when the diaphragm portion is displaced upward due to an increase in internal pressure of the cell, the diaphragm portion and the internal terminal can be surely peeled or ruptured from each other.

Further, since the bonding portion of the internal terminal is made flush with the diaphragm portion-side surface of the insulating member, it is possible to suppress variations in the position of the bonding portion of the internal terminal and hence possible to eliminate variations in bonding strength between the diaphragm portion and the internal terminal.

Further, the diaphragm portion is formed with a downwardly projecting protuberance, the internal terminal is formed with a flat base portion having a bonding portion, the insulating member is formed with a bonding hole, and with the bonding portion of the internal terminal positioned within the bonding hole of the insulating member, the base portion of the internal terminal is embedded in the insulating member and the protuberance of the diaphragm portion is bonded to the bonding portion of the internal terminal positioned within the bonding hole. Thus, since the base portion having the bonding portion of the internal terminal is formed flat, it is easy to effect machining of the internal terminal.

Further, since the internal terminal embedded in the insulating member has a lead mounting portion extending outward from one end face of the insulating member and the lead mounting portion is folded back from the one end face so as to be in contact with the underside of the insulating member, it is possible to make the area of the lead mounting portion large, a connecting lead of the power generating element can be connected to any desired position of the lead mounting portion having such a large area, and therefore the freedom of layout for the cell interior can be improved at the time of designing a small-sized cell or the like.

Further, since vent openings extending from end faces of the insulating member into communication with the portion located under the diaphragm portion are formed in the diaphragm portion-side surface of the insulating member, the gas present in the interior of the cell which gas has increased in its pressure flows slowly from the vent openings substantially in parallel with the thin-walled portion of the diaphragm portion. Therefore, a shock of the interior electrolyte induced upon dropping of the cell can be absorbed by the vent openings and thus it is possible to provide a current path cut-off mechanism in a cell wherein the diaphragm portion is not made to operate by such as a shock of electrolyte in the event of drop of the cell.

What is claimed is:

1. A current path cut-off mechanism in a cell, comprising:
   a cell case which houses a power generating element therein,
   a cell lid to shield an interior of said cell case in a hermetically sealed manner;
   a diaphragm portion formed in part of said cell lid and capable of being displaced upward in response to a change in internal pressure of said cell case;
   an internal terminal connected to said power generating element and having a bonding portion bonded to said diaphragm portion approximately centrally; and
   an insulating member to insulate said internal terminal and said cell lid from said power generating element,
   wherein a current path is formed between said cell lid and said power generating element through said diaphragm portion and said internal terminal, a part of said internal terminal is embedded in said insulating member, said bonding portion is exposed from said insulating member to be flush with a surface of said insulating member on a side of said diaphragm portion, and a metallic plate is additionally embedded in said insulating member by insert molding to said cell lid, and has a welded portion welded to said cell lid.

2. A current path cut-off mechanism in a cell according to claim 1, wherein said internal terminal embedded in said insulating member has a lead mounting portion extending outward from one end face of the insulating member, said lead mounting portion being folded back from said one end face of the insulating member so as to be in contact with the underside of the insulating member.

3. A current path cut-off mechanism in a cell according to claim 1, wherein vent openings are formed in the diaphragm portion-side surface of said insulating member so as to extend from end faces of the insulating member into communication with the portion located under the diaphragm portion.

4. A current path cut-off mechanism in a cell according to claim 1, wherein said welded portion is flush with said bonding portion.

* * * * *

UNITED STATES PATENT AND TRADEMARK OFFICE
CERTIFICATE OF CORRECTION

PATENT NO. : 6,165,637　　　　　　　　　　　　　　　　　　　　　　Page 1 of 1
DATED : December 26, 2000
INVENTOR(S) : Tadamitsu Azema It is certified that error appears in the above-identified patent and that said Letters Patent is hereby corrected as shown below:

<u>Title page,</u>
<u>Column 1,</u>
Item [54] , . Insert -- IN A CELL -- after "MECHANISM".

Signed and Sealed this

Thirtieth Day of October, 2001

Attest:

NICHOLAS P. GODICI
Attesting Officer　　　Acting Director of the United States Patent and Trademark Office